United States Patent

[11] 3,561,604

| [72] | Inventor | Kokichi Yotsumoto |
| --- | --- | --- |
| | | Sagamihara-shi, Japan |
| [21] | Appl. No. | 788,244 |
| [22] | Filed | Dec. 31, 1968 |
| [45] | Patented | Feb. 9, 1971 |
| [73] | Assignee | Caterpillar Mitsubishi Ltd. |
| | | Chiyoda-ku Tokyo, Japan |
| [32] | Priority | Jan. 26, 1968 |
| [33] | | Japan |
| [31] | | 43/4731 |

[54] FILTER ELEMENT
4 Claims, 5 Drawing Figs.

[52] U.S. Cl. ............................................. 210/484,
210/489, 210/493
[51] Int. Cl. ............................................. B01d 27/08
[50] Field of Search ............................................. 210/484,
493, 489

[56] References Cited
UNITED STATES PATENTS

| 3,198,336 | 8/1965 | Hyslop..................... | 210/493X |
| --- | --- | --- | --- |
| 3,241,680 | 3/1966 | Humbert, Jr. ............. | 210/484 |
| 3,305,098 | 2/1967 | Cowles...................... | 210/484 |
| 3,310,177 | 3/1967 | Briggs et al. ............... | 210/493X |
| 3,353,457 | 11/1967 | Whittingham et al. ....... | 210/484X |

Primary Examiner—John Adee
Attorney—Wenderoth, Lind and Ponack

ABSTRACT: A filter element comprising an outer wrapper, an improvement wherein pores are provided in juxtaposed relationship to each other along a joint of the outer wrapper.

KOKICHI YOTSUMOTO,
INVENTOR

FILTER ELEMENT

This invention relates to a filter element for use in internal combustion engines, and particularly to a filter element comprising an outer wrapper and a filter paper wherein the joint of the outer wrapper has openings located therein.

Figure 1:
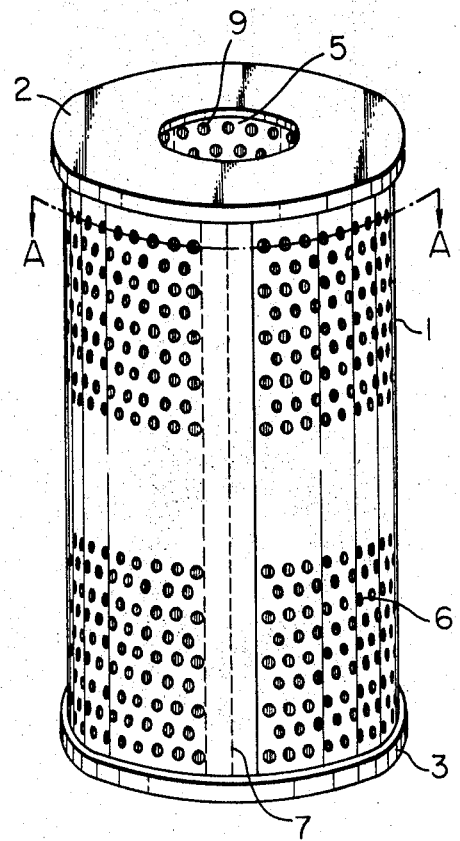
Figure 2:
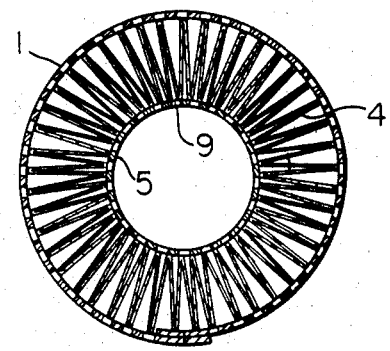
Figure 3:
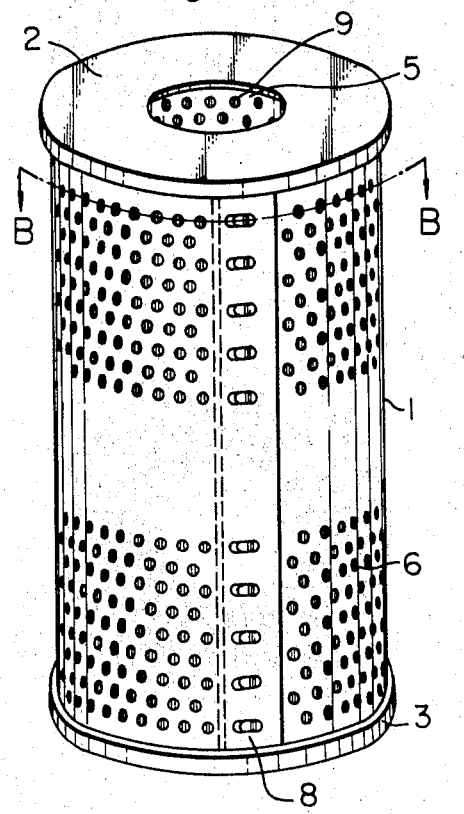
Figure 5:
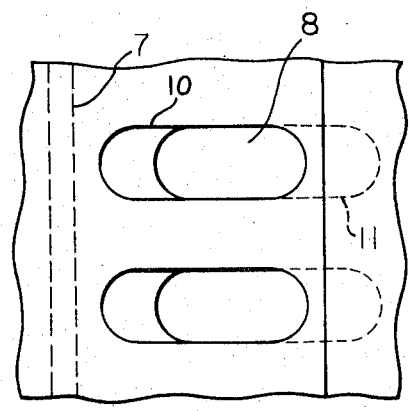
Figure 4:
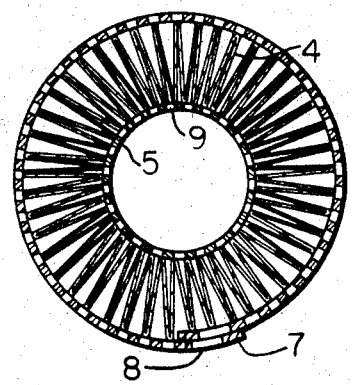

In the accompanying drawings, FIG. 1 is a rough elevation of a conventional filter element; FIG. 2 is a sectional view taken along the line A—A of FIG. 1; FIG. 3 is a rough elevation showing one embodiment of the invention; FIG. 4 is a sectional view taken along the line B—B of FIG. 3; and FIG. 5 is a rough sketch of a rectangular opening at the joint of the cylindrical outer wrapper.

The conventional filter element comprises, as shown in FIGS. 1 and 2, an outer wrapper 1 having a plurality of small apertures 6, an upper end plate 2, a lower end plate 3, a convoluted filter paper 4 and a center tube 5 containing a plurality of small apertures 9. The filter element of the present invention may be used as an oil filter element, a fuel filter element, a hydraulic filter element on an air cleaner element. Considering the oil filter element application, oil enters through apertures 6 in the outer wrapper and comes into contact with the outside of the filter paper 4. The oil is filtered by passing through pores in the filter paper and passes through apertures 9 and into the inside of the center tube 5. The collected dust is deposited on the outer surface of the filter paper. Conventional filter elements of this type have two defects which result from the absence of small apertures in the joint (seamed part) 7 of the outer wrapper 1. One of these defects is that the portion of the filter paper which is situated just beneath joint 7 collects very little dust due to a lessened oil flow which results from the aforesaid absence of apertures in the joint which results in the effective area of the filter paper as a whole being decreased. The other defect is that the filter paper convolutions or pleats have a tendency to be pushed together at one point due to the nonuniform distribution of hydraulic pressure about the filter paper which is caused by the absence of apertures in the joint.

An object of the invention is to provide a filter element which is free from the foregoing defects.

The filter element of the invention, as shown in FIGS. 3 and 4, comprises an outer wrapper 1 having a plurality of openings 8 with roughly the same apertures 6 in spaced relation along joint 7, an upper end plate 2 and a lower end plate 3 fitted respectively to the upper and lower ends of said outer wrapper 1, a cylindrical center tube 5 disposed inside the outer wrapper 1, and a convoluted filter paper 4 interposed between said outer wrapper 1 and said center tube 5, said wrapper characterized by having a plurality of openings 8 for the flow of oil into the filter paper portion inside the joint 7. The shape of opening 8 may be oblong, such as rectangular and elliptical, but generally preferred is a shape obtained by forming both ends of an oblong rectangle in a circular shape as shown in FIG. 5. The area of the opening 8 can be determined optionally. The cylindrical outer wrapper of the filter element of the invention can be easily made by providing oblong openings 10 and 11 in overlapping juxtaposed relationship to each other at both ends (a portion which will be a joint when forming a cylinder) of a rectangular outer wrapper material, and sewing the both end portions so that the openings 10 and 11 overlap at least partially, thereby to form an opening 8. Since the pores 10 and 11 have an oblong shape, the formation of opening 8 can be ensured even if the sides are misaligned and the sewing is more or less inaccurate.

The advantages of the filter element of this invention are that the effective filtering area is increased markedly as compared to a conventional filter element due to the increased flow of the oil through opening 8 into that portion of the filter paper which is beneath the joint. In addition, because of a uniform distribution of hydraulic pressure at any time of the inflow of oil, the deviation of convolutions of the filter paper is prevented.

According to the result of a test which has been made on the test equipment specified by the Society of Automotive Engineer, in specification SAE J.806, the accumulated dust on the convolutions, at a pressure difference of 0.7 kg./cm.$^2$ across the conventional element and a flow rate of 50 liters/min., weighed 90 to 100 gm., while in case of the improved element it weighted 110 to 120 gm.

This is mainly due to the fact that the oil had uniform access to the convolutions which increased the effective filtering area which, in turn, extended the change period of the element by 10 to 30 percent.

I claim:

1. In a filter element having an outer wrapper of rectangular form having opposite sides fastened together in an overlapping joint to form a cylinder defining an upper and a lower open end, a center tube disposed within said cylinder, a convoluted filter paper interposed between said outer wrapper and said center tube, an upper end plate and a lower end plate fitted respectively to the upper and lower ends of said outer wrapper, a plurality of apertures in said outer wrapper and said center tube, the improvement comprising a plurality of elongated openings formed along said joint in both of said opposite sides, said openings being oriented in spaced relation along the joint with their elongated direction transverse to said cylinder axis, said openings in one of said opposite sides being in juxtaposed, at least partially overlapping, relationship with corresponding openings in the other of said opposite sides whereby slight misalignment of the opposite sides will not prevent through passage of fluid through said openings.

2. A filter element as claimed in claim 1 wherein the shape of said elongated openings is eliptical.

3. A filter element as claimed in claim 1 wherein the shape of said elongated openings is rectangular.

4. A filter element as claimed in claim 1 wherein the shape of said elongated openings is rectangular with the transverse ends being circular in shape.